United States Patent
Louis et al.

(10) Patent No.: US 8,560,280 B2
(45) Date of Patent: Oct. 15, 2013

(54) METHOD FOR CALCULATING A NAVIGATION PHASE IN A NAVIGATION SYSTEM INVOLVING TERRAIN CORRELATION

(75) Inventors: Christian Louis, Orsay (FR); Sébastien Reynaud, Savigny sur Orge (FR)

(73) Assignee: Thales, Neuilly sur Seine (FR)

( * ) Notice: Subject to any disclaimer, the term of this patent is extended or adjusted under 35 U.S.C. 154(b) by 262 days.

(21) Appl. No.: 13/100,030

(22) Filed: May 3, 2011

(65) Prior Publication Data
US 2012/0203519 A1    Aug. 9, 2012

(30) Foreign Application Priority Data

May 5, 2010   (FR) ..................................... 10 01942

(51) Int. Cl.
*G06G 7/78*     (2006.01)
*G01C 21/16*    (2006.01)
*G01C 21/30*    (2006.01)
*G01S 13/60*    (2006.01)

(52) U.S. Cl.
USPC ................... 703/2; 342/63; 342/64; 701/408; 701/469; 701/480; 701/505; 701/518; 701/532; 701/536; 703/6

(58) Field of Classification Search
None
See application file for complete search history.

(56) References Cited

U.S. PATENT DOCUMENTS

| | | | | |
|---|---|---|---|---|
| 4,829,304 | A * | 5/1989 | Baird | 342/63 |
| 5,450,345 | A * | 9/1995 | Raymer et al. | 701/505 |
| 6,233,522 | B1 * | 5/2001 | Morici | 701/408 |
| 6,512,976 | B1 * | 1/2003 | Sabatino et al. | 701/469 |
| 7,305,303 | B2 * | 12/2007 | Soehren et al. | 701/480 |
| 2005/0273257 | A1 * | 12/2005 | Hager et al. | 701/223 |
| 2008/0169964 | A1 * | 7/2008 | Hawkinson | 342/64 |
| 2012/0203455 | A1 * | 8/2012 | Louis et al. | 701/505 |

OTHER PUBLICATIONS

Bergman, Niclas; Ljung, Lennart; Gustafsson, Fredrik "Terrain Navigation Using Bayesian Statistics" IEEE Control Systems, vol. 19, issue 3, pp. 33-40 (1999) available at <http://ieeexplore.ieee.org/xpls/abs_all.jsp?arnumber=768538>.*

Bergman, Niclas "Recursive Bayesian Estimation: Navigation and Tracking Applications" Dissertation, Linkoping University, (1999) available at <http://www.student.nada.kth.se/kurser/kth/2D5342/kurspaket/NiclasBergman.pdf>.*

* cited by examiner

*Primary Examiner* — Kamini S Shah
*Assistant Examiner* — Jay B Hann
(74) *Attorney, Agent, or Firm* — Baker & Hostetler LLP

(57) ABSTRACT

A method for calculating a navigation phase for a carrier, in a navigation system involving terrain correlation, includes determining a navigability map in which each point of interest of an onboard map is associated with a navigability score. The method is applicable to all terrain aided navigation techniques, and allows the consideration of the quality of the onboard maps and terrain sensors used.

4 Claims, 2 Drawing Sheets

METHOD FOR CALCULATING A NAVIGATION PHASE IN A NAVIGATION SYSTEM INVOLVING TERRAIN CORRELATION

CROSS-REFERENCE TO RELATED APPLICATIONS

This application claims priority to foreign French patent application No. FR 10 01942, filed on May 5, 2010, the disclosure of which is incorporated herein by reference in its entirety.

BACKGROUND OF THE INVENTION (a) Field of the Invention

The present invention relates to a method for calculating a navigation phase for a carrier in a navigation system involving terrain correlation. It applies notably to the field of carrier navigation, and more particularly to navigation systems operating notably in accordance with terrain correlation methods, terrain aided navigation being designated by the initials TAN.

(b) Description of the Related Art

Terrain aided navigation or TAN, constitutes a particular means of navigation that can be applied to a great diversity of carrier vehicles, for example aircraft, submarines, self-guided missiles, etc.

There exist three main known means aimed at meeting the navigation requirements of carriers. The first main known means comprises inertial navigation techniques. The second main known means comprises radionavigation techniques. The third main known means comprises terrain aided navigation techniques.

Inertial navigation consists in utilizing information provided by inertial platforms. The operation of an inertial platform is based on the Einstein-Galileo relativity principle, postulating that it is possible, without the aid of signals exterior to a carrier, to measure on the one hand the speed of rotation of the carrier with respect to an inertial frame of reference, for example defined by a geocentric reference frame associated with fixed stars, and on the other hand the specific force applied to the carrier: typically its acceleration in the inertial frame of reference, decreased by the acceleration due to gravity. Typically, an inertial navigation system, commonly designated by the initials INS, is a device making it possible to measure these two quantities by means of sensors such as gyrometers and accelerometers, commonly three of each type, disposed along three orthogonal axes, the set of these sensors forming an inertial measurement unit commonly designated by the initials "IMU". Temporal integration of the acceleration data, and projection into the navigation reference frame on the basis of the speed of rotation data, allow the determination of the position and speed of the carrier relative to the earth, knowing an initial state of these data. However, a drawback related to temporal integration is that the error associated with the data thus determined is an increasing function of time. This error increases more than linearly, typically in an exponential manner, the variation of the error commonly being called the drift of the inertial platform. It is thus necessary, for applications requiring precision navigation, to hybridize the inertial measurements with other measurements of position and/or speed and/or attitude of the carrier that are provided by complementary sensors, such as baroaltimeters, odometers, Pitot probes, etc., with the aim of decreasing the drift of the inertial platform. Such sensors provide information on the kinematic state of the carrier without requiring any access to exterior signals or onboard maps, and are commonly called low-level sensors.

Radionavigation consists in utilizing the signals arising from beacons emitting radioelectric signals, so as to derive therefrom information regarding the positioning of the carrier in relation to these beacons. A widely used radionavigation technique is the satellite-based geo-positioning technique, commonly designated according to the initials GNSS corresponding to the conventional terminology "Global Navigation Satellite System", and one of the representatives of which is the GPS technique, corresponding to the conventional terminology "Global Positioning System". One of the drawbacks related to radionavigation techniques is related to the fact that reception of the signals originating from the beacons is not guaranteed everywhere at every moment, and may notably be affected by the geophysical environment of the carrier, as well as by the surrounding electromagnetic noise, jamming techniques being able notably to jeopardize the operation of a radionavigation device. Furthermore, the emitting beacons being maintained by operators, the integrity of the radionavigation data arising therefrom is greatly dependent on their good will. Radionavigation, and notably satellite-based geo-positioning and inertial navigation, are for example complementary navigation techniques, and a hybridization of the two techniques may turn out to be very efficacious in practice. Inertial navigation indeed constitutes a very good local estimator of long-term drifting positioning, and satellite-based geo-positioning being very unreliable over a short duration because of the aforementioned drawbacks, but not exhibiting any drift. However, in the most critical applications, and notably for military applications, it is essential to resort to other sources of information regarding position and/or speed and/or attitude of the carrier so as to ensure hybridization with an inertial navigation technique. It is notably desirable that these alternative sources allow measurements of position and/or speed and/or of attitude of the carrier which are autonomous, not prone to jamming, and discreet.

Terrain aided navigation or TAN consists in utilizing geophysical measurements of data delivered by an appropriate sensor, with reference data specific to a terrain of coverage of the navigation. The sensors are thus used jointly with a reference map of the terrain, also called an onboard map. These sensors allow the reading of a characteristic datum about the terrain, and terrain aided navigation consists in comparing these values with the data of the onboard map, the onboard map being an a priori survey, obtained by appropriate means, of the values of these data over the navigation zone considered and hereinafter called the data production pathway. Terrain aided navigation is particularly adapted for hybridization with an inertial navigation technique, and makes it possible to alleviate the inadequacies of radionavigation. Of course, for optimal performance, it is possible to resort to a navigation system allowing hybridization of the three aforementioned navigation techniques.

Generally, any navigation system involving terrain correlation thus comprises a plurality of onboard sensors included in the inertial platform, as well as the terrain sensor, an onboard map representing the best possible knowledge about the reality of the geophysical data that the onboard sensor must measure, and a navigation filter. The navigation filter makes it possible to arbitrate in real time, between the information provided by the inertial platform and that provided by the comparison between the measurements provided by the terrain sensor and the onboard map. The arbitration is carried out by the filter as a function of its a priori knowledge of the errors in the measurements provided. This knowledge is grouped together in error models. The error models relate to the inertial platform, the errors of the inertial platform being greater or smaller according to the quality of the equipment; the error models also relate to the terrain sensor, and also the onboard map, the errors of the latter being greater or smaller according to the quality of the data production pathway. The equipment error models originate from the information provided by the manufacturers, and/or from measurements performed via specific studies. The error models of the onboard maps are provided by the data producers.

An essential aspect of navigation is the stochastic nature of the phenomena considered. Indeed, sensors produce errors in accordance with stochastic models, and the knowledge of the geophysical data being rather uncertain, solving the problem of navigation by filtering renders the navigation performance intrinsically stochastic. Thus, the filter used in a navigation system may be considered to be an estimator of a stochastic process, that is to say the device which at any instant gives the dynamic state of the carrier modeled as a random variable.

A first exemplary navigation system involving terrain correlation is based on the altimetric navigation technique. This technique consists in navigating an aerial carrier with the aid of an inertial platform, of a terrain sensor of radioaltimeter or multi-beam laser scanner type, measuring the distance from the carrier to the terrain in one or more given direction(s), and of an onboard map of Digital Terrain Model or DTM type, charting the altitudes of points of the ground over a geolocalized regular grid.

A second exemplary navigation system involving terrain correlation is based on the bathymetric navigation technique. This technique consists in navigating a surface carrier or underwater carrier with the aid of an inertial platform, of a terrain sensor of mono-beam or multi-beam bathymetric sounder type, measuring the distance from the carrier to the bottom of the sea in one or more given direction(s), and of an onboard map of bathymetric map type, charting the altitudes of points of the sea bed over a geolocalized regular grid.

A third exemplary navigation system involving terrain correlation is based on the gravimetric navigation technique. This technique consists in navigating an air, sea or underwater carrier with the aid of an inertial platform, of a terrain sensor of gravimeter or accelerometer type, measuring the local gravity field or its anomaly, and of an onboard map of gravimetric anomaly map type, charting the values of the anomaly of the gravity field at points of the globe over a standardized regular grid.

A fourth exemplary navigation system involving terrain correlation is based on the technique of navigation by vision. This technique consists in navigating an aerial carrier with the aid of an inertial platform, of a terrain sensor of onboard camera type which delivers images of the landscape overflown at a given frequency in the visible or infrared region, and of two onboard maps, an onboard map of geolocalized Orthoimage type, that is to say an image re-sampled in such a way that the effects of the relief have been deleted, that is to say the effects for which the scale is the same at all points, as well as an onboard map of DTM type.

Within the framework of navigation systems involving terrain correlation, designers are notably confronted with a certain number of technical problems stated hereinbelow:

it is necessary to define a navigation system making it possible to achieve a desired navigation quality according to a set of criteria determined, for example, according to a least cost criterion;

it is necessary to determine the most faithful possible error models for the inertial platform, the terrain sensor and the onboard map;

it is necessary to define the missions of a carrier, notably in terms of benchmark trajectory, during a mission preparation phase, so as to determine an optimal trajectory along which the quality of the signal delivered by the terrain sensor is a maximum, the optimal trajectory having also to be defined as a function of other performance criteria of the mission of the carrier and of operational constraints related to the theater of the mission. The mission preparation phase must for example be based on a navigability criterion which is relevant, that is to say representative of the richness of the signal delivered by the terrain sensor;

it is necessary to define an efficacious and robust navigation filter capable of taking into consideration at best all the error models relating to the various hardware components of the system, that is to say the error of the inertial platform, of the terrain sensor and of the onboard map.

SUMMARY OF THE INVENTION

The object of the present invention is principally to solve the aforementioned technical problem, relating to the preparation phase of a navigation mission. In mission preparation methods known from the prior art, only the hardness criterion, presented hereinafter, is used. The hardness criterion presents the drawback of being appropriate only for navigation systems based on altimetry or bathymetry techniques. Furthermore, the hardness criterion does not take into account, according to the methods known from the prior art, either the quality of the terrain sensor employed, or the errors of the onboard map. The assumptions adopted are generally a supposedly perfect terrain sensor and a supposedly perfect onboard map, these assumptions having a negative impact on the quality of the results obtained by the computation methods used.

An aim of the present invention is to alleviate at least the aforementioned drawbacks, by proposing a method taking notably into account an error model of the onboard map, and based on a navigability criterion that can be applied in a generic manner to all navigation systems involving terrain correlation, regardless of the techniques implemented.

An advantage of the present invention is that the proposed method can allow the consideration of extra criteria such as the quality of the terrain sensors and onboard maps.

For this purpose, the subject of the present invention is a method for calculating a navigation phase for a carrier in a navigation system involving terrain correlation, modeled by a system of discrete-time equations in accordance with a relation of the type:

$$\begin{cases} X_{t+1} = F_t X_t + V_t \\ Y_t = h_t(X_t) + W_t, \end{cases}$$

where the term $X_t$, comprises at least the kinematic state of the system, the initial state $X_0$ containing at least the error of the initial inertial platform modeled as a centered Gaussian random variable with covariance $P_0$; the matrix $F_t$ of the linear evolution of the state contains at least the inertial platform model used; $Y=(Y_t, t \geq 0)$ the observations vector is formed at least the measurements of the terrain sensor; $V_t$ and $W_t$ are centered independent Gaussian white noise with respective positive definite covariances $Q_t$ and $R_t$, said noise being mutually independent and independent of the initial state $X_0$; the term $h_t$ represents the combination of the model of the terrain sensors and of the onboard maps, the navigation system comprising at least:
- a navigation block comprising an inertial platform and at least one terrain sensor which are accompanied by their error models,
- at least one onboard map, the method calculating a navigability map determining for a plurality of points of interest of the onboard map, navigability scores, the calculation method taking into account an error model of said onboard map, the navigability score at a point X of the onboard map being a function of the terrain gradient, the terrain gradient being defined by the gradient of the function $h=h_{terrain}$.

In one embodiment of the invention, the error model of the onboard map may be a null model.

In one embodiment of the invention, said navigability score at a point X of the onboard map may be equal to the square of the norm of the terrain gradient $\|\nabla_X h_{terrain}(X)\|^2$.

In one embodiment of the invention, said navigability score at a point X of the onboard map may be equal to the square of the norm of the terrain gradient weighted by a weighting coefficient $\alpha(X)$ taking into account relative qualities of the terrain, i.e. $\alpha(X) \cdot \|\nabla_X h_{terrain}(X)\|^2$.

In one embodiment of the invention, the weighting coefficient $\alpha(X)$ may be equal to the inverse of the scalar variance of the noise at the point X, i.e. VAR(X).

In one embodiment of the invention, VAR(X) may be equal to the square of the standard deviation of the Gaussian white noise corresponding to the map error model at each point X of the terrain, the map model then being regarded as a Gaussian white noise model.

The subject of the present invention is also a system for calculating a navigation phase comprising a navigability map computation module, receiving as a first input the data arising from an error model of the onboard map and the onboard map, characterized in that the module for computing the navigability map implements a method for calculating a navigation phase according to any one of the embodiments described, and yields a navigability map destined for a module for optimizing the trajectory of the carrier.

BRIEF DESCRIPTION OF THE DRAWINGS

Other characteristics and advantages of the invention will become apparent on reading the description, given by way of example, offered with regard to the appended drawings which represent.

DESCRIPTION OF THE PREFERRED EMBODIMENTS

Figure 1:
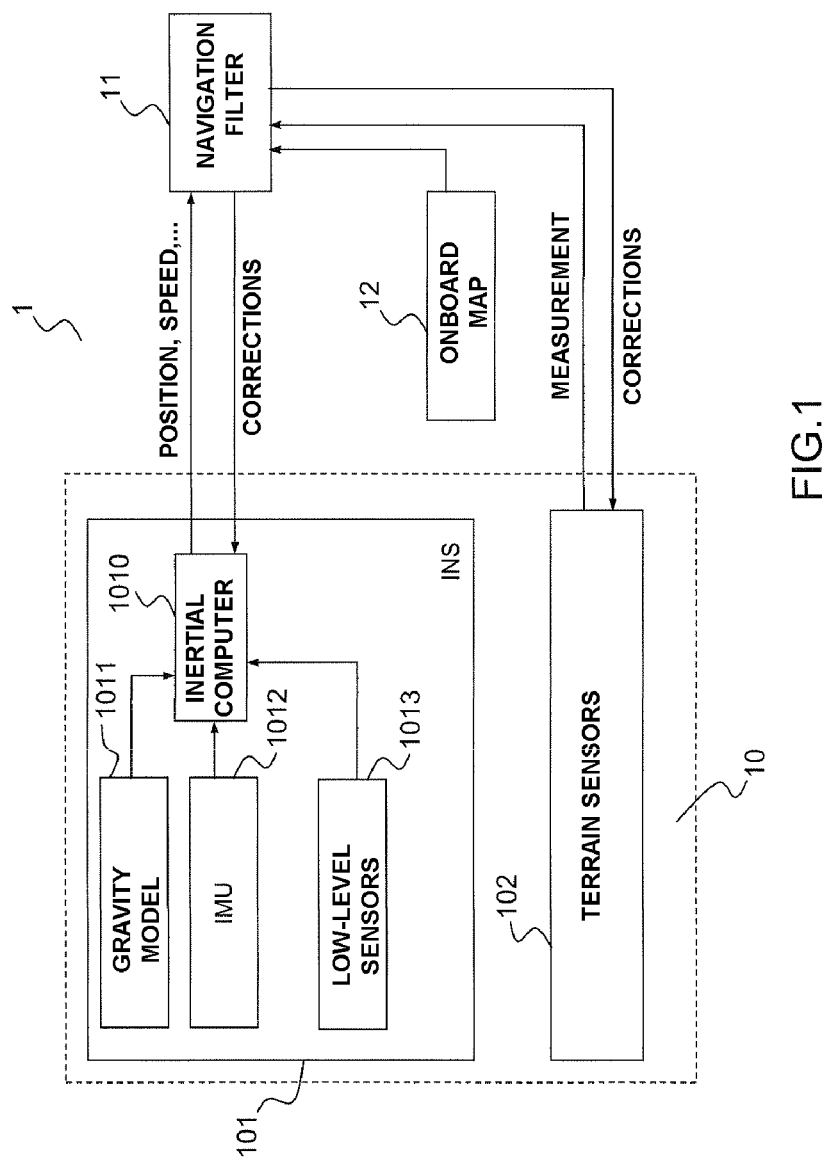
FIG. 1, a diagram illustrating in a schematic manner the structure of a navigation system involving terrain correlation.

FIG. 1 presents a diagram illustrating in a schematic manner the structure of a navigation system involving terrain correlation.

Typically, a navigation system 1 comprises a navigation block 10, a navigation filter 11 and an onboard map 12.

The navigation block 10 can comprise an inertial platform 101 and one or a plurality of terrain sensors 102. The inertial platform 101 can notably comprise an inertial computer 1010, receiving data originating from a gravity model 1011, from an IMU 1012 and from one or a plurality of low-level sensors 1013.

The navigation filter 11 receives carrier position, speed and attitude data, originating from the inertial computer 1010. The navigation filter 11 receives geophysical measurements of data originating from the terrain sensors 102. Also, the navigation filter 11 accesses the data contained in the onboard map 12. The navigation filter 11 may be implemented in appropriate computation devices, and yields estimations of the kinematic state of the carrier. The navigation filter 11 is also able to apply corrections to the parameters for configuring the inertial computer 1010 and terrain sensors 102. Typically, the navigation filter 11 can for example correct biases of the terrain sensors 102, or else drifts of the inertial platform 101.

The onboard map 12 can for example be formed by a set of data stored in a memory.

As was previously mentioned, the mission preparation methods known from the prior art involve a navigability criterion. Hereinafter, the term "navigability" is understood to mean just the contribution of the terrain to good navigation. The customarily employed navigability criterion is commonly called the hardness or hardness factor. The hardness factor is given by the following relation:

$$f = \sqrt{\frac{\sigma_T \sigma_P}{2\pi}}, \qquad (1)$$

where $\sigma_T$ designates the standard deviation of the altitude variation, and $\sigma_P$ designates the standard deviation of the variation of the slopes of the terrain.

It is also possible to define abridged hardness criteria, taking as an example, for example, the criterion reduced to $\sigma_T$ and that reduced to $\sigma_P$.

The terrain is then all the more favorable to altimetric charting the higher the hardness factor f. It is possible to class the terrain into several categories, depending on the value of the hardness factor f, for example to class the terrain into the "flat" category if the hardness factor f lies between 0 and 0.35, into the "undulating" category if f lies between 0.35 and 0.75, into the "rugged" category if f lies between 0.75 and 2, into the "very rugged" category if f lies between 2 and 3.6, and into the "extremely rugged" category if f is greater than 3.6.

It is possible to calculate navigability maps, the aim of which is to provide a geo-referenced representation, that is to say one in which each point may be designated by geographical coordinates, bringing to the fore the zones for which the terrain is more or less favorable to terrain correlation. According to such representations, each point or zone of the terrain is associated with a navigability score measuring its ability to provide the terrain correlation method with quality information. Various algorithms, in themselves known from the prior art, then make it possible to utilize the data of the navigability maps, in addition to the criteria and constraints customarily taken into account for the calculation of missions, so as to determine optimal trajectories of the carrier with the aim of achieving performance criteria for the navigation system.

In a TAN system, the elements contributing to good navigation are exclusively:
- the information contained in the terrain overflown, or more precisely the information which the carrier accesses,
- the capacity of the terrain sensor to upload the terrain information, the precision of the onboard inertial platform and associated low-level sensors, the navigation filter.

The advantage of the hardness criterion presented above is that it involves only the characteristics of the terrain, and therefore meets the definition of navigability fixed hereinabove; however, it presents notably the following drawbacks:

it is not naturally generalizable to other TAN techniques, it does not possess any simple link with a navigation filter's performance computations, it cannot take the errors of the onboard map into account, even for applications implementing the altimetric technique, the hardness criterion does not reflect exactly the navigation quality that may be expected of a terrain.

The present invention proposes the implementation of a relevant navigability criterion, closer to the mechanism of the navigation filter used while being independent thereof, and perfectly generalizable to all types of terrain aided navigation. Within the framework of the present invention, the navigability criterion is based on the Cramer-Rao bound.

A few essential elements relating to the Cramer-Rao bound are recalled here: the Cramer-Rao bound makes it possible to obtain a lower bound on the precision with which it is possible to ascertain the estimated variables, for example the position, the speed and the attitude of a carrier on the basis of measurements, performed by the terrain sensor, of the geophysical characteristics of its environment, of the onboard map and of the inertial platform. Thus, the Cramer-Rao bound depends on the parameters of the inertial platform, the terrain sensors, the quality of the onboard maps as well as the environment seen by these sensors during the trajectory followed by the carrier. By writing the problem expressed as a state model in discrete time indexed by t, the estimation of the state vector $X_t$ comprising at least the inertial errors in position, speed and attitude, can be formulated in accordance with the following relation:

$$\begin{cases} X_{t+1} = F_t X_t + V_t \\ Y_t = h_t(X_t) + W_t, \end{cases} \quad (2)$$

where the term $X_t$, comprises at least the kinematic state of the system, that is to say in particular the errors of the inertial platform in position, speed and attitude, $X_0$ containing at least the error of the initial inertial platform modeled as a centered Gaussian random variable with covariance $P_0$; the matrix $F_t$ of the linear evolution of the state contains at least the inertial platform model used; $Y=(Y_t,t\geq 0)$ the observations vector is formed at least of the measurements of the terrain sensor of the TAN; the terms $V_t$ (which represents the measurement noise related to the sensors of the inertial platform) and $W_t$ (containing inter alia the noise related to the terrain sensor and as well as the noise related to the error of the onboard map) are centered independent Gaussian white noise with respective positive definite covariances $Q_t$ and $R_t$. Both noise terms are mutually independent and independent of $X_0$; the term $h_t$ represents the combination of the model of the sensors and of the available onboard maps used.

The recursive expression serving for the computation of the Cramer-Rao bound can then be written in accordance with the following relation:

$$J_{t+1}(X_{t+1}) = E[\nabla_{X_{t+1}} h_{t+1}{}^T(X_{tk+1})] R_{t+1}^{-1} [\nabla_{X_{t+1}} h_{t+1}{}^T(X_{tk+1})]^T + (Q_t + F_t(X_t) J_t^{-1} F_t^T(X_t))^{-1} \quad (3), \text{where:}$$

$J_t$ is the Fisher information matrix associated with the estimation problem considered, that is to say the inverse of the Cramer-Rao bound.

The terms appearing in relation (3) can be divided into two distinct groups:

the first term $E_X\{(\nabla_{X_{t+1}} h_{t+1})^T R_{t+1}^{-1} (\nabla_{X_{t+1}} h_{t+1})\}$ corresponds to a supply of information related to the gradient of the terrain seen by the observation function h and weighted by the parameters of noise related to the measurement of the terrain sensor and to the terrain error via $R_t$;

the second term $(Q_t + F_t \cdot J_t^{-1} \cdot F_t^T)^{-1}$ corresponds to the aggregate information before the new observation having regard to the past information, the dynamics of the state and the loss of information due to state noise, that is to say in the case of TAN to a loss of information related to the dynamics of the state, or else the inaccuracy of the inertial platform.

It is proposed to determine a navigability criterion reflecting just the contribution of the terrain to the quantity of information available at an instant t. The first aforementioned term, representing a supply of information about the terrain at the instant t, constitutes an appropriate basis for determining the navigability criterion. However, this term shows a coupling between the terrain and the terrain sensor model used.

In order to dispense with this coupling between the observation model h and the terrain, with the aim of defining a navigability criterion based solely on the terrain information, it is proposed to reduce the contribution of the sensor to the simple reading of the value of the terrain at the current point, by putting $h = h_{terrain}$. By interpreting this term in a manner that is solely local to the point considered, it is possible to omit the expectation at X. In order to allow direct computation, the onboard map is moreover used as sole realization of the true terrain. The term R can then serve to characterize the map error:

the term $\nabla_X h_{terrain}(X) \cdot R_X^{-1} \cdot \nabla_X h_{terrain}(X)^T$ can thus be interpreted as the quantity of information supplied by the terrain at the point X;

the term related to R dependent on X (the terrain point) may be considered to be a weighting term related to the relative quality of the knowledge of the various zones of the terrain.

The proposed navigability criterion may be expressed as a function of the norm squared of the terrain gradient, i.e.:

$$\|\nabla_X h_{terrain}(X)\|^2 \quad (4).$$

Thus, the navigability criterion expresses the capacity of the terrain to provide information locally to a navigation filter.

Advantageously, the navigability criterion may be weighted by the map error. In this case, the navigability score of a point of the terrain may be defined at any point X by:

$$\alpha(X) \cdot \|\nabla_X h_{terrain}(X)\|^2 \quad (5), \text{where}$$

$\alpha(X)$ is a weighting coefficient allowing the consideration of the relative qualities of the terrain and $\|\nabla_X h_{terrain}(X)\|^2$ the norm of the gradient squared of the terrain, itself at the point X.

In the particular case of an onboard map furnished with an error model of the Gaussian white noise type, the matrix R in relation (3) hereinabove reduces to the scalar matrix of the covariance of the white noise at the point X, VAR(X).Id, Id representing the identity matrix, and VAR(X) represents the scalar variance of the noise at the point X. It is then possible to compute the value of the weighting coefficient explicitly:

$$\alpha(X) = \frac{1}{VAR(X)}. \quad (6)$$

In the other cases, it is not possible to establish an analytical formula for α(X) in a simple manner. Nonetheless, for any terrain, it is possible to establish a weighting field for the term $\|\nabla_X h_{terrain}(X)\|^2$ as a function of the relative qualities of the various terrain zones. The navigability criterion thus obtained also measures a capacity of the terrain to provide information for navigation.

A navigability map composed of the navigability scores can then be used in any procedure for trajectory optimization under operational constraints, such procedures being in themselves known from the prior art. The navigability criterion thus defined may be applied regardless of the TAN technique envisaged in the navigation system. The computation of the navigability scores is directly derived from the expected performance of the TAN, and they are therefore more faithful to the performance of the TAN navigation filters.

Figure 2:
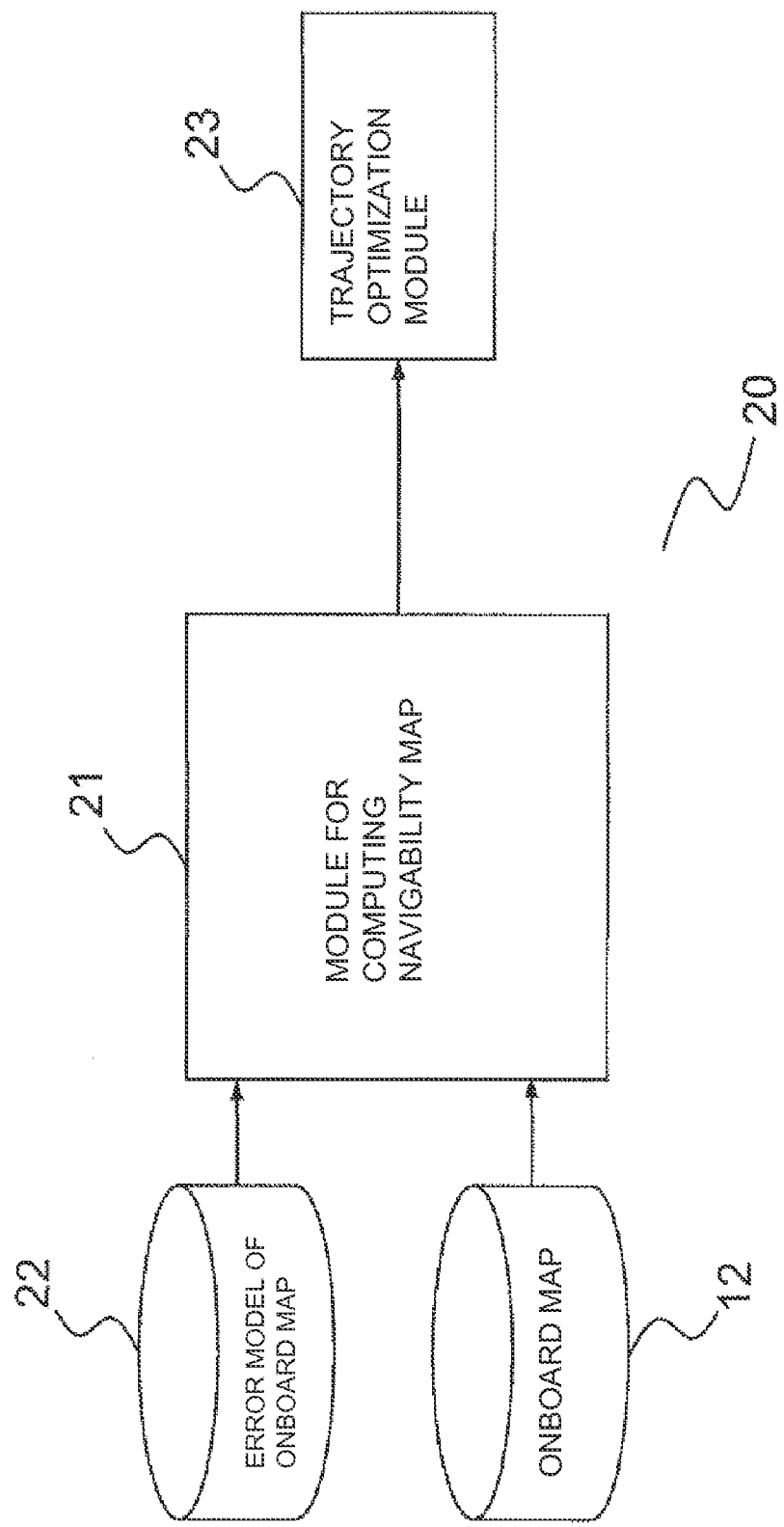
FIG. 2, a diagram illustrating in a schematic manner a system for calculating a navigation phase, implementing a calculation method according to one of the embodiments of the invention.

FIG. 2 presents a diagram illustrating in a schematic manner a system for calculating a navigation phase, implementing a calculation method according to one of the previously described embodiments of the invention.

A system for calculating a navigation phase 20 can comprise a module for computing the navigability map 21, receiving as a first input the data arising from an error model of the onboard map 22 and the onboard map 12. The module for computing the navigability map 21 implements the computation of the navigability scores for all the points of the onboard map 12, in accordance with relations (4) to (6) hereinabove according to one of the embodiments described, and yields as output the navigability map, which may be utilized in the form of input data, by a trajectory optimization module 23, in itself known from the prior art.

The system for calculating a navigation phase 20 can for example be implemented in a dedicated computer, or else as software via a computer program.

The invention claimed is:

1. A method of calculating a navigation phase for a carrier in a navigation system involving terrain correlation, modeled by a system of equations in discrete time in accordance with a discrete-time relation of the type:

$$\begin{cases} X_{t+1} = F_t X_t + V_t \\ Y_t = h_t(X_t) + W_t, \end{cases}$$

where the term $X_t$, comprises at least the kinematic state of the system, the initial state $X_0$ containing at least the error of the initial inertial platform modeled as a centered Gaussian random variable with covariance $P_0$; the matrix $F_t$ of the linear evolution of the state contains at least the inertial platform model used; $Y=(Y_t, t \geq 0)$ the observations vector is formed at least of the measurements of the terrain sensor; $V_t$ and $W_t$ are centered independent Gaussian white noise with respective positive definite covariances $Q_t$ and $R_t$, said noise being mutually independent and independent of the initial state $X_0$; the term $h_t$ represents the combination of the model of the terrain sensors and of the onboard maps, the navigation system comprising at least:

a navigation block comprising an inertial platform and at least one terrain sensor which are accompanied by their error models, at least one onboard map, the method calculating a navigability map determining for a plurality of points of interest of the onboard map, navigability scores, the calculation method taking into account an error model of said onboard map, the navigability score at a point X of the onboard map being a function of the terrain gradient, the terrain gradient being defined by the gradient of the function $h=h_{terrain}$, wherein said navigability score at a point X of the onboard map is equal to the square of the norm of the terrain gradient weighted by a weighting coefficient α(X) taking into account relative qualities of the terrain, denoted as $\alpha(X) \cdot \|\nabla_x h_{terrain}(X)\|^2$, and wherein the weighting coefficient α(X) is equal to the inverse of the scalar variance of the noise at the point X, denoted as VAR(X).

2. The method according to claim 1, wherein the error model of the onboard map is a null model.

3. The method according to claim 1, wherein VAR(X) is equal to the square of the standard deviation of the Gaussian white noise corresponding to the map error model at each point X of the terrain, the map model then being regarded as a Gaussian white noise model.

4. A system for calculating a navigation phase comprising a navigability map computation module, receiving as a first input the data arising from an error model of the onboard map and the onboard map, wherein the module for computing the navigability map implements a method for calculating a navigation phase according to claim 1, and yields a navigability map destined for a module for optimizing the trajectory of the carrier.

* * * * *